US009158777B2

(12) United States Patent
Greaves et al.

(10) Patent No.: US 9,158,777 B2
(45) Date of Patent: Oct. 13, 2015

(54) AUGMENTED REALITY METHODS AND APPARATUS

(75) Inventors: Allen Greaves, Spokane, WA (US); Luke Richey, Liberty Lake, WA (US)

(73) Assignee: Gravity Jack, Inc., Liberty Lake, WA (US)

( * ) Notice: Subject to any disclaimer, the term of this patent is extended or adjusted under 35 U.S.C. 154(b) by 1177 days.

(21) Appl. No.: 12/750,572

(22) Filed: Mar. 30, 2010

(65) Prior Publication Data

US 2011/0242133 A1   Oct. 6, 2011

(51) Int. Cl.
*G06F 3/00*   (2006.01)
*G09G 5/00*   (2006.01)
*G06T 13/00*   (2011.01)
*G06F 17/30*   (2006.01)

(52) U.S. Cl.
CPC ................. *G06F 17/30058* (2013.01)

(58) Field of Classification Search
None
See application file for complete search history.

(56) References Cited

U.S. PATENT DOCUMENTS

| 6,787,750 | B1 | 9/2004 | Sauer | |
| 7,064,742 | B2* | 6/2006 | Navab et al. | 345/156 |
| 7,487,468 | B2* | 2/2009 | Tanaka et al. | 715/863 |
| 7,519,218 | B2 | 4/2009 | Takemoto et al. | |
| 7,612,748 | B2* | 11/2009 | Tateuchi | 345/81 |
| 7,616,807 | B2 | 11/2009 | Zhang et al. | |
| 7,657,065 | B2 | 2/2010 | Kotake et al. | |
| 8,542,906 | B1* | 9/2013 | Persson et al. | 382/154 |
| 2003/0005439 | A1 | 1/2003 | Rovira | |
| 2003/0076980 | A1 | 4/2003 | Zhang et al. | |
| 2005/0027600 | A1 | 2/2005 | Phillips | |
| 2005/0234333 | A1 | 10/2005 | Takemoto et al. | |
| 2005/0253870 | A1 | 11/2005 | Kotake et al. | |
| 2007/0038944 | A1* | 2/2007 | Carignano et al. | 715/757 |
| 2007/0081695 | A1 | 4/2007 | Foxlin et al. | |
| 2007/0098234 | A1 | 5/2007 | Fiala | |
| 2007/0133841 | A1 | 6/2007 | Zhang et al. | |
| 2007/0273610 | A1 | 11/2007 | Baillot | |
| 2008/0253656 | A1 | 10/2008 | Schwartzberg et al. | |
| 2009/0165140 | A1 | 6/2009 | Robinson et al. | |
| 2009/0190003 | A1 | 7/2009 | Park et al. | |
| 2009/0195538 | A1* | 8/2009 | Ryu et al. | 345/419 |

OTHER PUBLICATIONS

"Augmented reality"; http://en.wikipedia.org/wiki/Augmented_reality; Mar. 15, 2010; 13 pp.
"Fiduciary marker"; http://en.wikipedia.org/wiki/Fiduciary_marker; Mar. 15, 2010; 2 pp.
"Fast Approximate Nearest Neighbors With Automatic Algorithm Configuration"; Muja et al.; 2009; 10 pp.
"Speeded-Up Robust Features (SURF)"; Bay et al.; Sep. 10, 2008; pp. 1-14.

\* cited by examiner

*Primary Examiner* — Andrew Yang
(74) *Attorney, Agent, or Firm* — Wells St. John P.S.

(57) ABSTRACT

Augmented reality methods and apparatus are described according to some aspects of the disclosure. In one aspect, a method of experiencing augmented data includes using a source system, emitting a dynamic symbol which changes over time, using a consumption system, receiving the emission of the source system, using the consumption system, analyzing the emission which was received by the consumption system to determine whether the dynamic symbol is present in the emission, and using the consumption system, generating a representation of augmented data to be consumed by a user of the consumption system as a result of the analyzing determining that the dynamically changing symbol is present in the emission of the source system.

14 Claims, 5 Drawing Sheets

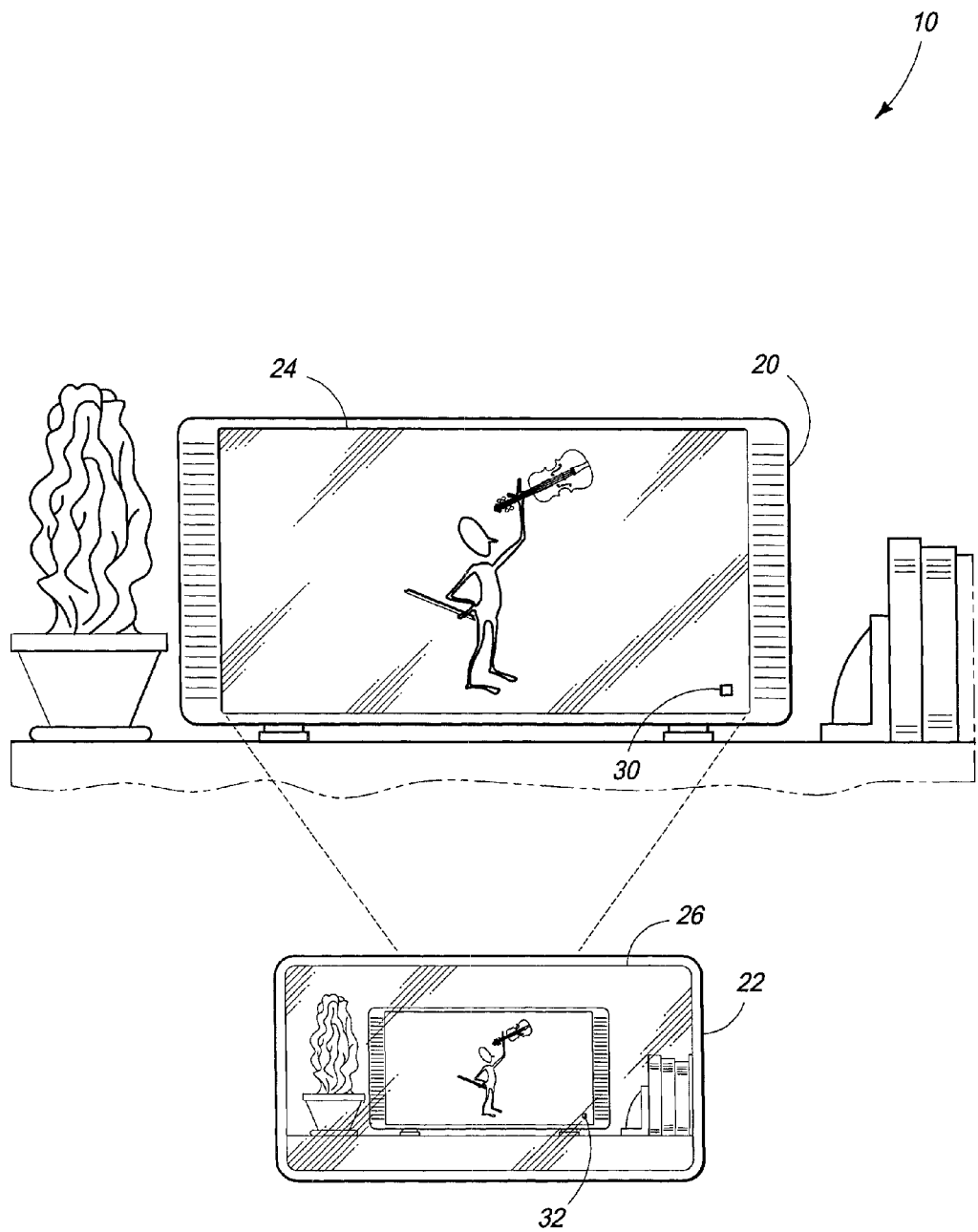

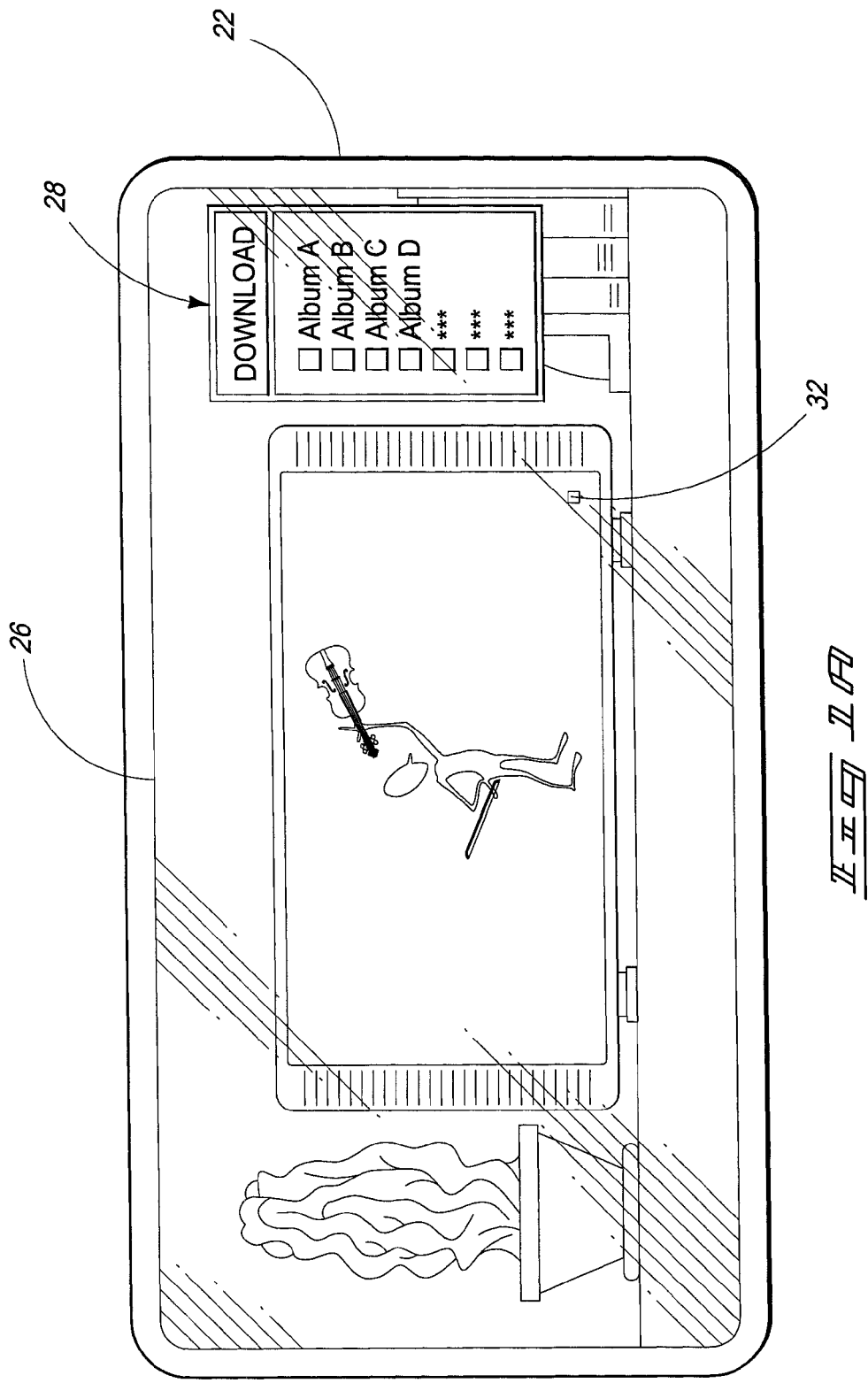

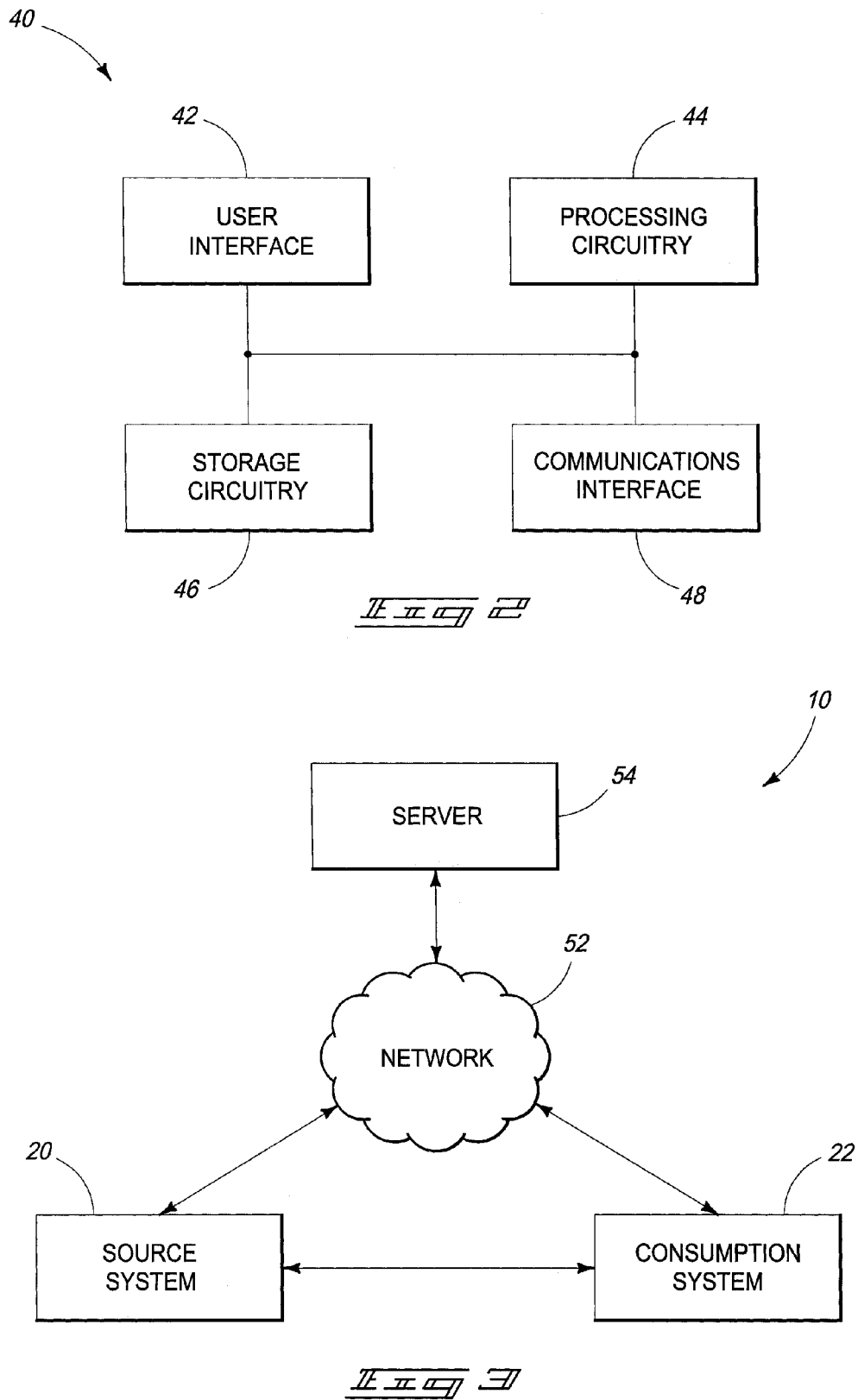

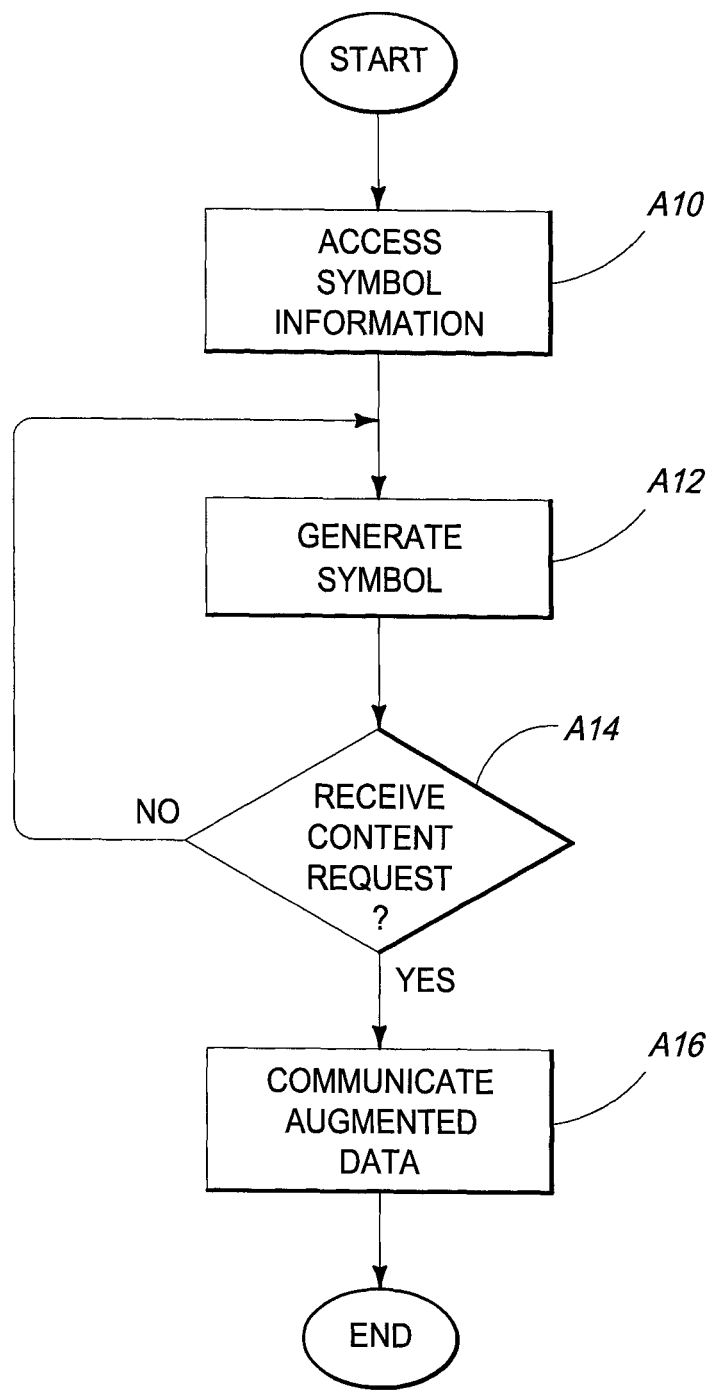

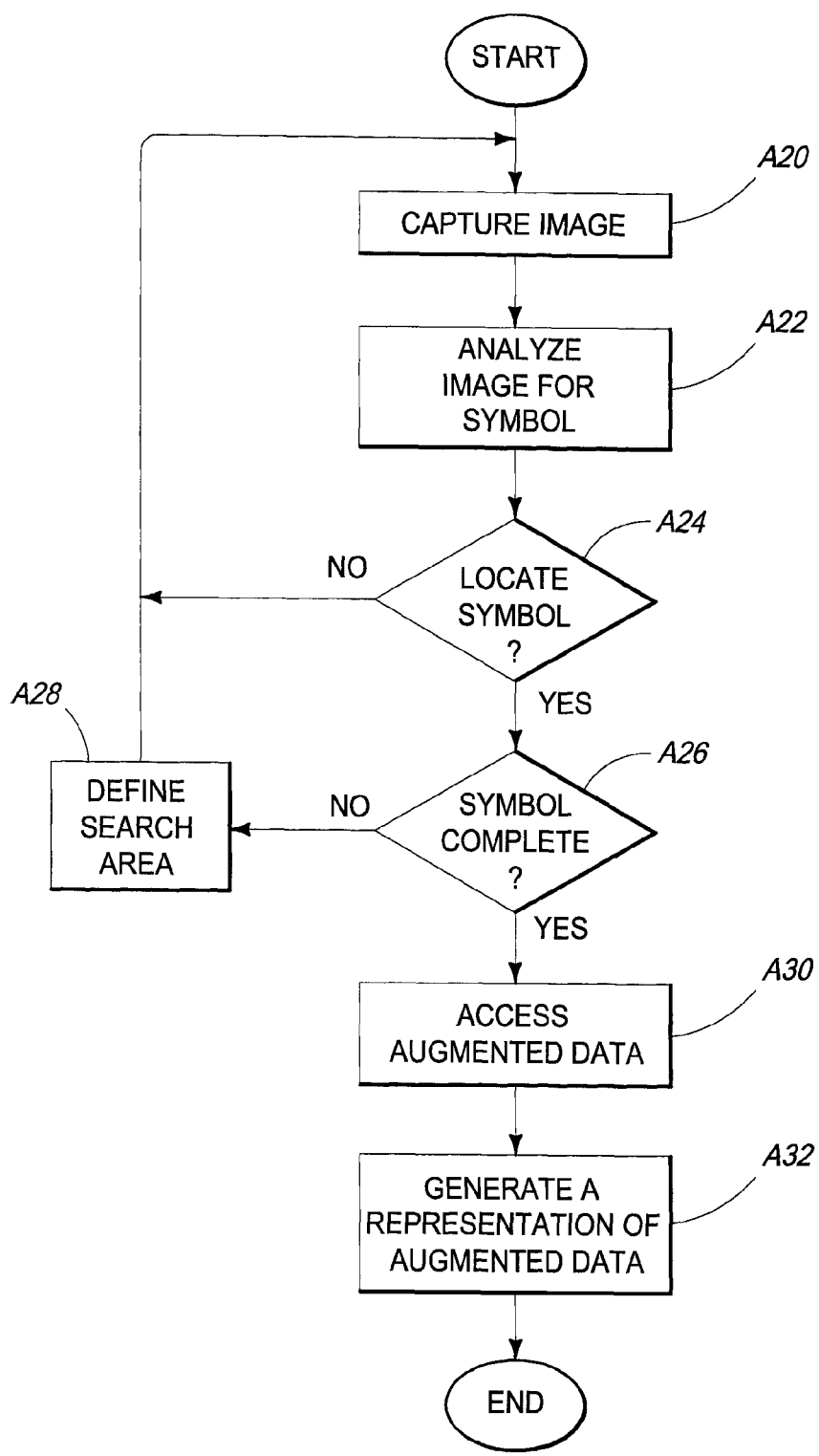

AUGMENTED REALITY METHODS AND APPARATUS

TECHNICAL FIELD

This disclosure relates to augmented reality methods and apparatus.

BACKGROUND OF THE DISCLOSURE

Computing systems have continually involved and the popularity of computing systems continues to increase. The technology of computing systems continues to advance creating new uses and applications for the computing systems. For example, the processing speeds, storage capacities and network communication speeds are constantly increasing.

Furthermore, computing systems have evolved from office or desk systems to smaller devices, some of which have increased portability, which further expands the possible applications of computing systems. More specifically, notebook computers have evolved from desktop computers, and more recently, handheld portable devices have also advanced significantly. For example, personal digital assistants, media players, cellular telephones, smartphones, and other portable devices have much-increased functionality as communications networks have been improved allowing greater rates of data transfer, smaller processors of increased power to process information have been developed, and smaller memories and disk drives of increased capacities have been created.

Some computing systems have evolved to a sufficient extent to provide augmented reality which augments the physical world with virtual computer-generated imagery in one example. Some portable computing systems have sufficient processing, storage and communications capabilities to provide real-time augmented reality data for users.

At least some aspects of the disclosure are directed to improved methods, apparatus and programming for augmented reality systems.

BRIEF DESCRIPTION OF THE DRAWINGS

FIGS. 1 and 1A are illustrative representations of a media system according to one embodiment.

FIG. 2 is a functional block diagram of a computing system of a media system according to one embodiment.

FIG. 3 is a functional block diagram of a media system according to one embodiment.

FIG. 4 is a flow chart of a method performed by a source system according to one embodiment.

FIG. 5 is a flow chart of a method performed by a consumption system according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Some aspects of the disclosure described herein are directed towards media systems which can implement augmented reality where the physical world is augmented with additional information, which may be referred to as augmented data. For example, images of the physical world observed through a consumption system may be augmented with augmented data, for example in the form of visual and/or audio data which may be experienced (consumed) by users. At least some aspects of the disclosure are directed to the generation and identification of symbols (which may also be referred to as markers) which may include dynamic symbols which change over time as discussed further below in accordance with some examples. Once a consumption system has detected an appropriate symbol, augmented data may be provided to a user to augment the user's experience of the physical world. Additional aspects are described in the following disclosure.

Referring to FIG. 1, an example of a media system 10 is shown according to one embodiment. Media system 10 is configured to implement augmented reality operations in one embodiment. In the illustrated arrangement, media system 10 includes a source system 20 and a consumption system 22. In other embodiments, a plurality of source systems 20 and/or consumption systems 22 may be provided for example in an interactive collaborative session.

Source system 20 is configured to generate a symbol 30 in one embodiment. Symbol 30 may be a symbol of recognition for use in augmented-reality systems in one example. According to some embodiments, source system 20 may generate the symbol 30 which changes over time and which may be referred to as a dynamic symbol. For example, the source system 20 may generate a dynamic symbol 30 by emitting light according to a pattern as described below in example embodiments.

In some embodiments, source system 20 may also be configured to generate additional information content, for example, a plurality of visual images via a display system 24. In some configurations, source system 20 is configured to embed the symbol 30 within other content being generated. In one more specific example where source system 20 is a television, the symbol 30 may be one or more pixels embedded within individual ones of a plurality of frames of television programming.

In other embodiments, source system 20 may generate light of the symbol 30 which is not embedded in other content. For example, source system 20 may include a dedicated light source (e.g., one or more LEDs) which is configured to emit light of the symbol 30 (the dedicated light source is not shown in FIG. 1) or display system 24 may be configured to only display the symbol 30 without display of other additional content at the same time. Other configurations are possible for generating symbol 30.

Consumption system 22 is configured to detect the presence of the symbol 30 in the described arrangement. The detection of the symbol 30 may be used to trigger operations with respect to provision of a representation of augmented data for one or more user(s) in one embodiment. In some aspects, consumption system 22 is configured to generate a plurality of visual images, for example via an appropriate display system 26, for observation by a user. In one embodiment, consumption system 22 is configured to generate the representation of augmented data for consumption (e.g., viewing) by a user as a result of the detection of the symbol 30. The symbol 30 may be reproduced as symbol 32 in images which are generated by display system 26 (e.g., if the display system 24 is within a field of view of a camera system of consumption system 22 which generates the images being displayed via display system 26 in one embodiment) and the content of these images may be processed or analyzed to detect the symbol 32.

In one embodiment, source system 20 and consumption system 22 are individually implemented as a respective computing system. In one embodiment described above, source system 20 may emit light to generate the symbol 30. In some embodiments also mentioned above, source system 20 may also generate a plurality of images via display system 24 which may include the symbol 30 as well as additional information content (e.g., television programming, smartphone display data, etc.). A plurality of generated images may include symbol 30 (which may also be referred to as a marker) in one embodiment. As described further below, the symbol 30 may be dynamically changing in some embodiments of the disclosure. In some examples, source system 20 may be configured as a television, personal computer, notebook computer, computer monitor, portable media device, personal digital assistant, cellular telephone, smartphone or any other device capable of generating a dynamic symbol with or without other additional content.

As mentioned above, consumption system 22 may be a computing system which generates a plurality of visual images via display system 26 in one embodiment. Consumption system 22 may include an appropriate camera system (e.g., not explicitly shown in FIG. 1 but provided upon a surface opposite to the display system 26 of consumption system 22 in one possible embodiment) for capturing images of the physical world which may include emissions from source system 20. Accordingly, at times, consumption system 22 may be oriented by a viewer to capture a scene which includes source system 20 and a plurality of images of the scene including the display system 24 of source system 20 may be generated by consumption system 22 in one embodiment.

In illustrative examples, consumption system 22 may be implemented as a portable media device, personal digital assistant, cellular telephone, smartphone, personal computer, notebook computer, glasses worn by a user including a camera and display system capable of generating images, or any other device capable of capturing images of the physical world and generating images and/or other media content for consumption by a user. Example media content may include information (e.g., visual images and audible data) of the physical world which is augmented by one or more representations of augmented data (e.g., additional virtual image content and/or audible content in one embodiment).

In one more specific example, the consumption system 22 may generate images of the physical world and which may include the symbol 32 captured by the camera system of the consumption system 22. Detection of the presence of the symbol 32 in the scene captured by the consumption system 22 may be used to trigger the consumption system 22 to generate a representation of augmented data for consumption by one or more users of the consumption system 22 in one embodiment.

Referring to FIG. 1A, one example of a representation of augmented data is described according to one embodiment. FIG. 1A depicts an image upon display system 26 which includes an example of a representation 28 of augmented data which may be generated following the determination that the symbol 30 was emitted by the source system 20. In the illustrated example, the source system 20 may be a television which displays visual images including the symbol 30 as well as additional information content (e.g., visual images of a musical performance in one example).

The display system 26 may replace part of the physical world contained in the images generated by the display system 26 with the representation 28 of augmented data in the form of virtual visual image information in the illustrated example. In some configurations, the representation 28 of augmented data may correspond to the additional information content being displayed by the source system 20. For example, the representation 28 of augmented data shown in FIG. 1A may be a discography of an entertainer being shown in the visual images generated by source system 20 and which may include a plurality of links which may be selected by the user to order and/or download albums of the entertainer (e.g., to consumption system 22) in one illustrative example.

In other embodiments, the augmented data to be consumed is not associated with the additional information content. For example, the representation of augmented data may be generated in the form of an avatar or other object that a user of the source system 20 has specified. Any other types or content of augmented data may be provided in other embodiments. Furthermore, source system 20 may not provide any other light emissions nor additional information content in some embodiments, but merely provide the symbol 30.

As discussed above, source system 20 and consumption system 22 may be individually implemented as a computing system 40 which is illustrated in one example embodiment in FIG. 2. Furthermore, a server described below may also be configured as a computing system 40 in some embodiments.

The illustrated example embodiment of computing system 40 includes a user interface 42, processing circuitry 44, storage circuitry 46, and a communications interface 48. Other embodiments of computing system 40 are possible including more, less and/or alternative components. For example, the computing system 40 may additionally include a camera system (not shown) in arrangements where computing system 40 is configured as consumption system 22.

User interface 42 is configured to interact with a user including conveying data to a user (e.g., displaying visual images for observation by the user) as well as receiving inputs from the user, for example, via a graphical user interface (GUI). User interface 42 may be configured differently in different embodiments.

In one embodiment, processing circuitry 44 is arranged to process data, control data access and storage, issue commands, and control other desired operations. Processing circuitry 44 may comprise circuitry configured to implement desired programming provided by appropriate computer-readable storage media in at least one embodiment. For example, the processing circuitry 44 may be implemented as one or more processor(s) and/or other structure configured to execute executable instructions including, for example, software and/or firmware instructions. Other exemplary embodiments of processing circuitry 44 include hardware logic, PGA, FPGA, ASIC, state machines, and/or other structures alone or in combination with one or more processor(s). These examples of processing circuitry 44 are for illustration and other configurations are possible.

Storage circuitry 46 is configured to store programming such as executable code or instructions (e.g., software and/or firmware), electronic data, databases, image data, augmented data, and/or other digital information and may include computer-readable storage media. At least some embodiments or aspects described herein may be implemented using programming stored within one or more computer-readable storage medium of storage circuitry 46 and configured to control appropriate processing circuitry 44.

The computer-readable storage medium may be embodied in one or more articles of manufacture which can contain, store, or maintain programming, data and/or digital information for use by or in connection with an instruction execution system including processing circuitry 44 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 48 is arranged to implement communications of computing system 40 with respect to external devices or systems (e.g., other computing systems 40, a server 54 shown in FIG. 3, cellular networks, networks including the Internet, GPS systems, etc.). For example, communications interface 48 may be arranged to communicate information bi-directionally with respect to computing system 40. Communications interface 48 may be implemented as wireless communications circuitry, a network interface card (NIC), serial or parallel connection, USB port, Firewire interface, flash memory interface, or any other suitable arrangement for implementing communications with respect to computing system 40.

Referring to FIG. 3, additional aspects regarding one possible configuration of media system 10 are described. The illustrated media system 10 includes the above-mentioned source system 20 and consumption system 22. Furthermore, the illustrated media system 10 includes a server 54 which may be coupled for communications with the source and consumption systems 20, 22. In one embodiment, source and consumption systems 20, 22 are coupled with and may communicate with server 54 via a network 52 which may be implemented as any suitable network for implementing communications, including for example, a wireless network, local or wide area networks, Internet, cellular network, and/or another suitable arrangement for implementing communications of digital information including wireless or wired communications.

In one embodiment, source system 20 and consumption system 22 communicate with one another. In one example, source system 20 and consumption system 22 communicate directly with one another, for example, using wired, ad hoc or Bluetooth wireless communications in illustrative examples. In another example, source system 20 and consumption system 22 communicate with one another using network and/or server 54. Other arrangements are possible for implementing communications between source system 20, consumption system 22 and server 54.

As mentioned above, consumption system 22 is configured to generate a representation of augmented data which may be considered to augment a user's experience of the physical world. In one embodiment, the symbol 30 generated by the source system 20 is used as a trigger to initiate generation of a representation of augmented data to be experienced by the user of the consumption system 22. In one more specific embodiment, consumption system 22 is configured to search images generated of scenes captured by the consumption system 22 for the presence of symbol 32 corresponding to symbol 30. Once the symbol 32 is located, the consumption system 22 accesses augmented data and generates a representation of the augmented data for consumption by a user of the consumption system 22 in one embodiment.

In one embodiment, the symbol 30 may be a dynamic symbol which changes over time as mentioned above. In one example, the symbol 30 implemented as a dynamic symbol may be emitted light which changes over time. In one more specific example, one or more characteristic of emitted light of the dynamic symbol may change over time, and the changing characteristic(s) of the light may be changed according to a pattern. Consumption system 22 may have information regarding the pattern and the information may be used to search images captured by consumption system 22 for the presence of a dynamic symbol 32 which matches the pattern. The information regarding the pattern may be accessed by consumption system 22 in any appropriate method. For example, the pattern may be stored in storage circuitry of system 22 or accessed from an external device via the communications interface 48 (e.g., from source system 20 or server 54) in illustrative examples.

In one example described above, a characteristic of emitted light may change over time to provide the dynamic symbol 30. In one implementation, the characteristic is chrominance of the emitted light which may change according to a pattern to provide the dynamic symbol 30. More specifically, the emitted light of the dynamic symbol 30 may change different colors (e.g., a pattern of red to blue to green of emitted light in one embodiment) according to a frequency as defined according to the pattern in one embodiment. In another example, the luminance of the emitted light of the dynamic symbol may change (e.g., provide a symbol including a plurality of different grayscale intensities in one embodiment) according to a frequency as defined according to the pattern in one implementation. In other embodiments, both the chrominance and luminance (or other characteristics) of the emitted light may be varied according to the pattern to provide a dynamic symbol 30. Different portions of the dynamic symbol 30 may have different characteristics of emitted light (e.g., different chrominances and/or luminances) in one example embodiment. In another specific example, some portions of the dynamic symbol 30 may individually include a plurality of different colors (e.g., adjacent pixels of the symbol 30 may have different colors during one of the portions of the dynamic symbol).

Accordingly, in one embodiment, the pattern defines the changes in the characteristic(s) of the emitted light and the frequency of changes. In some embodiments, the pattern of the symbol 30 may specify that the pattern of the emitted light be repeated (e.g., a sequence of different colors and/or luminances which are repeated and which are changed according to one or more frequencies and which may be referred to a light oscillation symbol in one example). Other characteristics of emitted light may be changed to provide the dynamic symbol in other embodiments. Furthermore, a dynamic symbol 30 may include a plurality of different portions (e.g., different colors or intensities) as discussed above. The portions of the dynamic symbol 30 may be displayed individually for a common time interval (i.e., at a common frequency) or for different time intervals as defined by the pattern in example embodiments.

As mentioned above, the symbol 30 may be displayed by display system 24 of source system 20 in one embodiment. If the source system 20 is a television, the symbol 30 may be changed (e.g., chrominance and/or luminance) between appropriate frames generated by source system 20. If the source system 20 is a portable device (e.g., smartphone), the symbol 30 may be changed in the display system 24 over time. Other sources of emitted light may be used to emit symbol 30 in other embodiments (e.g., a dedicated light source as mentioned above).

In one embodiment, consumption system 22 generates a plurality of sequential images of one or more captured scene(s). For example, in one implementation where the consumption system 22 is implemented as a portable device (e.g., smartphone), a user may move the consumption system 22 around to capture images of different scenes of the physical world. During use, the user may direct the consumption system 22 to capture images which include the display system 24 of source system 20 as shown in FIGS. 1 and 1A. The captured images may be processed (analyzed) in attempts to determine whether the symbol 32 is present or not in the images. Once it is determined that the symbol 32 is present, the consumption system 22 may generate a representation of augmented data to augment the user's experience of the physical world.

In one embodiment, the consumption system 22 is configured to process one or more pixels of individual captured images in an attempt to determine whether symbol 32 is present. Example methods of processing a plurality of images are described below with respect to an example symbol 32 which is dynamically changing in one implementation.

The processing circuitry 44 of consumption system 22 may access information regarding the pattern of the symbol 32 to be located in one embodiment. In example arrangements, information regarding the pattern may be received from communications interface 48 of consumption system 22, stored in storage circuitry 46 of consumption system 22 or accessed by any other appropriate method and processed by processing circuitry 44.

In one configuration, each pixel of a captured image may be analyzed individually or in a group (e.g., 4×4 group of pixels). An example analysis includes comparing an individual pixel or group of pixels with a first portion (e.g., color and/or intensity) of the pattern to determine whether the pixel(s) match the first portion of the pattern. An example processing method is described below if the first portion of the pattern is located in the pixel(s) being analyzed of a captured image. If the first portion of the pattern is not located in the pixel(s) being analyzed, then new pixel(s) of the same image may be selected and analyzed in one embodiment. In one embodiment, all of the pixels of an image may be processed or analyzed in an attempt to determine whether the first portion of the pattern of the symbol is present in the image being analyzed. Accordingly, a plurality of processing operations (e.g., analyzing data of a pixel) may be repeated numerous times for a given image in one embodiment.

In other configurations, less than an entirety of the pixels of an individual captured image (e.g., a subset of pixels of the entire captured image) may be analyzed to reduce the time and/or processing power requirements for analysis compared with analyzing an entirety of the pixels of the image. In one embodiment, the pixels of a subset of the image which are to be analyzed may be selected according to a predefined method (e.g., analyzing different pixels of an image which correspond to a checkerboard in one example).

In other embodiments, the pixels of a subset of the image to be analyzed may be randomly selected. Different methods may be used for randomly selecting the pixels of the subset to be analyzed in different configurations. In some arrangements, a plurality of processing operations (e.g., comparisons of data of respective individual ones of plural pixels to a portion of the symbol in a plurality of respective comparison processing operations) may be performed upon a single image depending upon the processing capabilities and acquisition rate of images. The pattern of a dynamic symbol may be repeatedly generated a plurality of times in some embodiments. A plurality of subsets of pixels of numerous images of the repeated pattern may be randomly selected and processed which may provide improved performance with respect to locating the initial portion of the dynamic symbol compared with sampling every pixel of the image in some arrangements. The randomization processing may be configured to provide reduced occurrences of false negative results in some embodiments.

If the analyzing of the entire image or one or more subsets of the image fails to locate the initial portion of the symbol, a subsequent image may be retrieved and processed by the processing circuitry 44 to attempt to locate the first portion of the pattern of the dynamic symbol 32 in one embodiment. As mentioned above, the pattern of the dynamic symbol may be repeatedly generated and additional images may be processed until the first portion of the pattern is located within one of the images in one embodiment.

After a first portion of a symbol 32 which is dynamically changing is detected in one of the images (and information regarding the location of the first portion of the symbol 32 in the image is ascertained in one example), then subsequent images may be processed with respect to the symbol 32 in an attempt to determine whether additional portions of the symbol 32 according to the pattern occur in the subsequent images (e.g., determine whether the next occurring color and/or luminance in the pattern is present after the detection of the first portion of the symbol 32). However, one or more of the source system 20 and the consumption system 22 may be moved during the capturing of images of a scene (e.g., if one or more of systems 20, 22 are portable), and accordingly, the location in the image where the first portion of the symbol 32 was detected may not correspond to the locations in subsequent images where subsequent portions of the symbol 32 occur.

In some embodiments, entireties of the subsequent images or subsets of the entireties of the subsequent images may be processed to attempt to locate the additional portions of the symbol 32, for example using the example methods described above.

In another embodiment, information regarding the location of where the first portion of the dynamic symbol 32 was detected in the respective image may be utilized to search less than the entireties of the subsequent images for the additional portions. For example, one or more search areas may be defined for the subsequent captured images in an attempt to provide focused searching for the additional portions of the symbol 32 with reduced processing compared with processing of the entireties of the subsequent images (e.g., processing of all pixels of a captured image or processing of subsets, random or otherwise, which generally correspond to entireties of the captured images). In some embodiments, the information regarding the identified location of the first portion of the symbol 32 in the respective image may be used to assist with the defining of the area to be searched in the subsequent images for the additional portions.

In one example embodiment, a circular search area may be defined about a point $A_0$ which is the identified location of a portion of the symbol 32 in one of images captured by the consumption system 22. In one implementation, processing continues by checking a circular search area region of radius rA using:

$$y_{A_0} - \sqrt{(rA+\epsilon A)^2 - (x_{A_0})^2} \leq y \leq y_{A_0} + \sqrt{(rA+\epsilon A)^2 - (x_{A_0})^2} \qquad \text{Eqn. 1}$$

where $\epsilon A$ is the error of the actual next location of the symbol 32 appearing in the captured images. This error is due to the fact that either of the source and/or consumption systems 20, 22 may move and fall outside of radius rA. Accordingly, a radius rA should be selected that contains a significant proportion of the next possible locations of the portion of symbol 32. Acceptable parameters (e.g., the radius rA and error $\epsilon A$) for determining the search area may be determined empirically to provide a reduced number of false negatives of detection of the symbol in one arrangement. Once the search area is identified, individual pixels occurring in the determined search area may be compared with the next portion of the dynamic symbol to be identified in attempts to locate the next portion of the dynamic symbol. Other embodiments are possible, for example, including searching an entirety of the subsequent image as mentioned above.

In one embodiment, information regarding movement of one or both of the source and consumption systems 20, 22 may be used to assist with searching of subsequent images. For example, some configurations of source and consumption systems 20, 22 may have circuitry (e.g., accelerometer) configured to provide information regarding movement of the respective systems 20, 22. Information regarding movement of one or both of the respective systems 20, 22 may be accessed and used to attempt to identify the search areas of subsequent images corresponding to the movement. For example, if the user of consumption system 22 moves the device to the right, the information regarding this movement may be utilized to assist with the determination of the search area of the subsequent image (e.g., the search area of the subsequent image may be biased to the left as a result of the user moving the field of view of the camera system of the consumption system 22 to the right). Similarly, information regarding detected movement of the source system 20 may be communicated to the consumption system 22 for use in guiding the searching of the respective images by consumption system 22 in one example.

After the area of the subsequent images to be searched has been identified (if such processing to determine the area is implemented), the appropriate pixels of the search area of the subsequent image are searched for the occurrence of the next portion of the symbol 32 in accordance with the pattern.

In another example, the entirety of the subsequent image may be searched and the information regarding the movement may be used to guide the searching to initial portions of the subsequent image using the information regarding the movement (e.g., start searching in left portions of an image based upon movement of the consumption system 22 to the right). Other search embodiments are possible.

In one embodiment, the pattern defines one or more frequencies for the changes of the different portions of the symbol 32. Accordingly, in one embodiment, the searching may be performed of one or more subsequent images until the time interval corresponding to the next additional portion has passed. The processing of images may revert back to the processing which attempts to locate the initial portion of the symbol 32 in the images as discussed above if the additional (e.g., next subsequent) portion of the pattern is not located prior to the expiration of the time interval for the respective additional portion in one arrangement.

Once an additional portion of the symbol 32 is located in a subsequent one of the images, additional subsequent images may be similarly processed to locate yet another (e.g., the next subsequent) portion of the symbol 32 if such is present in the pattern in one embodiment. Similar to the above, the subsequent images may be processed until a time interval for the next portion of the pattern has expired in this described example.

In one embodiment, a threshold number of portions of the symbol 32 may be specified which are to be located before the consumption system 22 concludes that it has located the symbol 32. Once the threshold number of portions of the symbol 32 has been located, the consumption system 22 may proceed to provide augmented data to the user. In one example, the threshold may be the entirety of the pattern. In other examples, the threshold may be less than the entirety of the pattern.

Any appropriate form of augmented data may be provided to supplement the user's experience of the physical world. In some examples, the augmented data which is provided is associated with the located symbol 32. For example, the source system 20 may be implemented as a portable device and the augmented data in the form of an object (e.g., avatar) may be depicted in the display system 26 of images generated by the consumption system 22 associated with the location of the symbol 32 in the images. In another example where the source system 20 depicts a plurality of images including television programming of a program, the augmented data may include information regarding the program which is not included in the television programming. In one illustrative example, if the programming is regarding a musical artist, the augmented data may include a discography of the artist which is available to purchase, for example via the Internet as discussed above. These examples of augmented data are merely illustrative and any type of augmented data which may supplement the user's experience of the physical world may be used. Furthermore, the augmented data may be associated with additional information content of the source system 20 or be unrelated to the additional information content (if any) of the source system 20 in some embodiments.

As mentioned previously, any suitable emission sources may be used to generate the symbol 30. In some embodiments, the emission source may be in the form of a light configured to generate the symbol 30 without an associated display system configured to display other content. In one example, this dedicated emitter of the symbol 30 of the source system 20 may be placed in a tourist attraction (e.g., national park) and detection of the corresponding symbol 32 by the consumption system 22 may trigger the generation of a representation of augmented data pertaining to the tourist attraction (e.g., information regarding the national park). Furthermore, the representations of augmented data may also be provided in one or more format including video data, audible data and/or other formats of representations of augmented data which may be experienced or consumed (i.e., perceived) by the user. These examples are merely illustrative and other applications of the media system 10 are possible.

Once the symbol 32 has been detected, appropriate augmented data to be experienced by the user may be accessed by the consumption system 22. Any suitable method for accessing the augmented data may be implemented. In one embodiment, the augmented data may be stored in storage circuitry 46 of the consumption system 22 and which is accessed by processing circuitry 44 of the consumption system 22 to generate a representation of the augmented data. In another embodiment, the consumption system 22 may communicate a request externally via the communications interface 48 of the consumption system 22 after the symbol 32 is detected and the augmented data may be received via the communications interface 48 as a result of communicating the request. In one more specific example, the request may be communicated to source system 20 which may provide the augmented data to the consumption system 22. Accordingly, in some embodiments, the source system 20 may specify the content of the augmented data to be generated by the consumption system 22. In another embodiment, server 54 communicates the augmented data to the consumption system 22. Any other appropriate method for the consumption system 22 to access the augmented data may be implemented.

In the example embodiments discussed above, a plurality of operations are performed with respect to the provision of representations of augmented data to a user. The processing of the different operations mentioned above may be implemented by the source system 20 and consumption system 22 in configurations of media system 10 which do not utilize a server. For example, source system 20 may generate the dynamic symbol, consumption system 22 may process images to detect the dynamic symbol and consumption system 22 may generate a representation of augmented data as a result of detection of the dynamic symbol. Furthermore, some embodiments of media system 10 described herein include a server 54 which may be configured to implement one or more operations with respect to provision of representations of augmented data to a user in conjunction with systems 20, 22. Server 54 is configured using the arrangement shown in FIG. 2 in one example.

In a more specific example, and as discussed herein in some embodiments, a source device 20 may generate a dynamic symbol which, upon detection by consumption system 22, initiates the provision of a representation of augmented data to a user of consumption system 22. In one embodiment, server 54 may be configured to store different patterns of different dynamic symbols and server 54 may communicate one or more patterns to source system 20 which are used by source system 20 to generate one or more dynamic symbols. In one embodiment, the server 54 may communicate one or more patterns of the dynamic symbols to the consumption system 22 for use by consumption system 22 in processing of images to locate one or more dynamic symbols.

In one more specific arrangement, the server 54 may obtain location information (e.g., GPS information) regarding locations of source and consumption systems 20, 22 and use the location information to implement one or more operations with respect to the generation of the representation of the augmented data. For example, the source system 20 and consumption system 22 may provide information regarding their locations to the server 54. Server 54 may use the location information of the consumption system 22 to identify one or more source systems 20 which are proximately located to the consumption system 22. The server 54 may use the location information of the system 22 to select and communicate patterns of dynamic symbols which are generated by source systems 20 which are proximately located nearby the consumption system 22 (e.g., in the vicinity of and capable of being viewed by consumption system 22) to the consumption system 22 for use by the consumption system 22 in locating the dynamic symbols of these source systems 20 in one embodiment.

In some implementations, consumption system 22 may acquire images which include the dynamic symbol and the images may be processed in attempts to locate the presence of the dynamic symbol. In one embodiment utilizing a server 54, the consumption system 22 may communicate image data of the images to server 54 which accesses the pattern of the dynamic symbol and then analyzes the images to determine if the dynamic symbol is present. As a result of detecting the dynamic symbol, server 54 may communicate a communication or indication externally of the server 54 (e.g., to one or more of source system 20 and consumption system 22) to cause at least one operation to be implemented with respect to the generation of the representation of the augmented data. For example, the communication may indicate that the dynamic symbol has been located to consumption system 22. Following the communication of the identification of the dynamic symbol to consumption system 22, consumption system 22 may provide the representation of the augmented data to a user (e.g., display visual augmented data to a user). In some arrangements, server 54 may store the augmented data and communicate the augmented data to consumption system 22 for display by consumption system 22. In other embodiments, the source system 20 may communicate the augmented data to the server 54 for communication to the consumption system 22.

In some embodiments, server 54 may receive requests for augmented data (e.g., from consumption system 22 processing images and locating the dynamic symbols) and communicate the requests to appropriate source device 20 to provide the augmented data to the consumption system 22. In another embodiment, server 54 may communicate the augmented data to consumption system 22 upon receipt of the requests or an indication from the consumption system 22 that it has detected the dynamic symbol.

Accordingly, in different embodiments, different operations with respect to generating dynamic symbols, processing images to locate dynamic symbols, providing augmented data, and other operations pertinent to the generation of the representations of the augmented data may be implemented by different ones of source system 20, consumption system 22 and/or server 54 (if present).

Referring to FIG. 4, one example method which may be performed by source system 20 is shown. The method may be implemented by processing circuitry of the source system 20 in one embodiment. Other methods are possible in other embodiments including more, less and/or alternative acts.

At an act A10, the processing circuitry may access information regarding a symbol to be generated. The information may be stored internally or accessed from an external source (e.g., server) in illustrative embodiments. In one example, a dynamic symbol is generated which changes over time. The processing circuitry may access a pattern which defines changes of one or more characteristics (e.g., chrominance, luminance) of the dynamic symbol and information regarding the timing of the changes (e.g., one or more frequencies) in one embodiment. The pattern may define a plurality of time intervals for displaying respective ones of different portions (e.g., chrominance and/or luminance) of the dynamic symbol in one embodiment. In some embodiments, different portions of the dynamic symbol may be generated for the same respective time interval or for different time intervals.

At an act A12, the symbol is generated. In one embodiment, an appropriate light source (e.g., display system, dedicated light) is controlled to emit light to generate the symbol. At least one characteristic of the emitted light may be varied or changed to generate a dynamic symbol in one embodiment. The source system may include a display system which is configured to emit the dynamic symbol using a portion of the display system and which may be embedded in additional information content as discussed above in some configurations. In other example arrangements, a dedicated light source may be used to generate the dynamic symbol.

At an act Act14, the processing circuitry may monitor for the reception of a content request after generation of the symbol. In one embodiment, a consumption system which detects the symbol may communicate the content request to the source system which requests the source system to communicate augmented data to the consumption system for use in generating a representation of the augmented data by the consumption system.

If the result of act A14 is affirmative, the augmented data may be communicated to a requesting consumption system at an act A16. In some arrangements, the source system may continue to generate the symbol during receipt of the content request and communication of augmented data.

If the result of act A14 is negative, the source system may continue to generate the symbol. Acts A14 and A16 may be omitted in some embodiments where the consumption system obtains the augmented data from a source other than source system 20.

Referring to FIG. 5, one example method which may be performed by consumption system 22 is shown. The method may be implemented by processing circuitry of the consumption system 22 one embodiment. Other methods are possible in other embodiments including more, less and/or alternative acts.

At an act A20, the consumption system captures an image of a scene.

At an act A22, the image is analyzed for the presence of the symbol generated by the source system (or a portion of a dynamic symbol which may change over time). In one arrangement, pixels of an entirety of the image are analyzed for the presence of the symbol. In other arrangements, less than all of the pixels of the entirety of the image are analyzed. For example, individual pixels or groups of pixels may be randomly selected or selected according to a specified arrangement. In one embodiment, the consumption system accesses information regarding the symbol (e.g., a pattern of the symbol) and compares the pixels being analyzed to the information regarding the symbol.

At an act A24, it is determined whether the analysis detected the symbol (or a portion of a dynamic symbol if utilized).

If the result of act A24 is negative, the process may revert back to act A20 to process a subsequently captured image.

If the result of act A24 is affirmative, it is determined at an act A26 whether the symbol is complete in arrangements which utilize a dynamic symbol (e.g., determine whether a threshold of portions of the dynamic symbol have been detected). Act A26 may be omitted in some embodiments (e.g., if a static symbol is utilized) whereupon the method would proceed to an act A30 discussed below.

If the result of act A26 is negative, a search area may be defined at an act A28 which may be utilized to search a subsequent image at act A22 for an additional portion of a dynamic symbol.

If the result of act A26 is positive, the symbol (either static or dynamic) is determined to have been located and the method proceeds to an act A30 to access augmented data from an appropriate source (e.g., storage circuitry of the consumption system or from externally of consumption system).

At an act A32, a representation of the augmented data may be generated by the consumption system. For example, the consumption system may generate the representations of augmented data including visual images and/or audible data in example formats. In some embodiments, the augmented data may be associated with the location of the symbol in the images generated by the consumption system (e.g., the augmented data may be placed in images generated by the consumption system at the location of the detected symbol). In other embodiments, the augmented data is not associated with the location of the symbol in the generated images.

Some of the above-described embodiments disclose the generation of a symbol by emitting light. In some example configurations described above, the symbol may be implemented as a dynamic symbol and at least one characteristic of the symbol (e.g., light) may change. The above-described example dynamic symbol of emitted light according to some embodiments of the disclosure may provide improvements with respect to static symbols (e.g., black and white graphical symbols) which have been used in some conventional arrangements.

In one example, distance for recognition of the dynamic symbol by the consumption system may be increased drastically as a change in light can be perceived easier than static symbols. For example, one possible static symbol in the form of a Chinese character has numerous edges, and accordingly, the consumption system may have to be located at a closer distance for sufficient resolution to identify the static symbol while light of a symbol which may be dynamically changing may be detected at greater distances from the source system.

As discussed above, a generated symbol 30 may be a pixel or a group of pixels of emitted light and at least one characteristic of the symbol may dynamically change. Accordingly, the symbol 30 may have a relatively simple and/or substantially featureless shape (e.g., single pixel or a group of pixels for example in a square shape—4×4 pixels in one example) compared with some static symbols having complex shapes which may be used. In other embodiments, the symbol 30 may have features or shapes, for example, including a horizontal, vertical or diagonal line of emitted light which dynamically changes as described herein. Numerous possible symbols 30 may be easily generated by using different colors, luminances and/or changing the ordering of the sequences of the changes according to different patterns in example embodiments. Furthermore, in some embodiments, one or more of the portions of a dynamic symbol 30 may include one or more different colors or luminances. In addition, the time intervals of the different portions of the symbols 30 may be different to provide additional different combinations of possible dynamic symbols 30 which may be used. Accordingly, numerous different dynamic symbols 30 may be easily created in some embodiments.

In another example, object orientation accuracy is increased in the sense that a static symbol may be continuously tracked and recognized in the environment while a dynamic change may stand out from an associated environment to a greater extent utilizing less computational power to orient an augmented reality object. In another example, the speed of recognition of a dynamic symbol may be faster due to the fact that image recognition of a static symbol may utilize increased computational power compared with recognition of a dynamic symbol. In yet another example, a symbol of emitted light may provide improved performance (e.g., ease of detection by the consumption system) in relatively low or no light situations compared with static symbol recognition techniques.

In yet a further example, computations of the consumption system to identify a dynamic symbol may be less compared with symbol recognition of a static symbol. In but one example, a static symbol in the form of a cross may be identified in an image by convolving the image to find unique features within the scene which correspond to a static symbol to be detected. This example convolution computation may be approximately $(m \times m) \times (width \times height$ of an image) where m is the kernel size of the convolution array. Furthermore, the convolution may be performed to progressively blur the image which brings out unique features in the image. This example processing may be performed several times on a single image which may also be progressively scaled to account for the differing distances that the symbol could be away from the camera capturing the scene. This relatively complex procedure may be contrasted with the relatively straightforward processing of comparing pixels of an image with portions of the pattern of a dynamic symbol according to some embodiments as described above. In one example comparison where a dynamic symbol includes three different colors to be identified, an example relatively straightforward processing method of one embodiment may utilize a computation time of $3 \times (width \times height$ of an image) which is less computation compared with the above-described method for a static symbol.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A method of experiencing augmented data comprising:
   using a source system, emitting a dynamic symbol which changes over time according to a pattern and which is configured to initiate generation of a representation of augmented data;
   using a consumption system, receiving an emission of the source system;
   communicating information regarding the pattern to the consumption system before the emitting;
   using the information regarding the pattern, analyzing the emission which was received by the consumption system to determine whether the dynamic symbol comprising the pattern is present in the emission which was received by the consumption system;
   using the consumption system, initiating generation of a representation of augmented data to be experienced by a user of the consumption system as a result of the analyzing determining that the dynamic symbol comprising the pattern is present in the emission which was received by the consumption system;
   wherein the emitting comprises emitting dynamically changing light to emit the dynamic symbol and the receiving comprises receiving the dynamically changing light;
   wherein the analyzing comprises comparing the dynamically changing light received by the consumption system and the information regarding the pattern;
   wherein the emitting comprises changing at least one characteristic of the dynamically changing light of the dynamic symbol according to the pattern, the comparing comprises comparing the at least one characteristic of the dynamically changing light with respect to the pattern, and the initiating comprises initiating as a result of the comparing determining that the dynamically changing light matches the pattern; and
   wherein the changing comprises changing the at least one characteristic comprising chrominance of the dynamically changing light according to the pattern and at a frequency specified by the pattern and the comparing comprises comparing the chrominance and the frequency of the dynamically changing light with respect to the pattern.

2. The method of claim 1 wherein the changing comprises changing another characteristic comprising luminance of the dynamically changing light according to the pattern and the comparing comprises comparing the luminance of the dynamically changing light with respect to the pattern.

3. The method of claim 1 wherein the changing comprises changing another characteristic comprising luminance of the dynamically changing light according to the pattern and at a frequency specified by the pattern and the comparing comprises comparing the luminance and the frequency of the dynamically changing light with respect to the pattern.

4. The method of claim 1 further comprising generating a plurality of images of the dynamically changing light received by the consumption system, and wherein the analyzing comprises comparing the dynamically changing light of the images with respect to the information regarding the pattern.

5. The method of claim 4 wherein the analyzing comprises analyzing different ones of the images to identify different portions of the dynamic symbol in the different ones of the images, and the comparing comprises comparing the different portions of the dynamic symbol with the information regarding the pattern.

6. The method of claim 5 wherein the analyzing comprises:
   locating at least one portion of the dynamic symbol at one location in a first of the images;
   using the one location, defining at least one area in a second of the images; and
   searching the at least one area in the second of the images for another portion of the dynamic symbol.

7. The method of claim 1 wherein the emitting comprises emitting the dynamically changing light having a substantially featureless shape.

8. The method of claim 1 further comprising specifying content of the augmented data using the source system.

9. The method of claim 1 wherein the emitting comprises emitting additional information content with the dynamic symbol, and wherein the representation of augmented data corresponds to the additional information content.

10. The method of claim 1 further comprising, using the consumption system, receiving the augmented data from externally of the consumption system.

11. The method of claim 10 further comprising communicating the augmented data from the source system to the consumption system.

12. The method of claim 10 further comprising:
   using the consumption system, communicating a request externally of the consumption system as a result of the analyzing determining that the dynamic symbol is present in the emission; and
   as a result of the communicating, receiving the augmented data from externally of the consumption system.

13. The method of claim 1 wherein the analyzing comprises analyzing using the consumption system.

14. The method of claim 1 wherein the analyzing determines that the dynamic symbol is present in the emission by identifying a first portion of the dynamic symbol in a first frame emitted by the source system and identifying a second portion of the dynamic symbol in a second frame emitted by the source system.

* * * * *